(12) United States Patent
Li et al.

(10) Patent No.: US 6,816,681 B2
(45) Date of Patent: *Nov. 9, 2004

(54) ANALOGOUS CHANNEL METHOD FOR PERFORMANCE MONITORING AND EQUALIZATION IN OPTICAL NETWORKS

(75) Inventors: Jingui Li, Nepean (CA); Suet Yuen, Kanata (CA); Michael J. Moyer, Nepean (CA)

(73) Assignee: Nortel Networks Limited, St. Laurent (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 172 days.

(21) Appl. No.: 09/161,433

(22) Filed: Sep. 24, 1998

(65) Prior Publication Data

US 2003/0053163 A1 Mar. 20, 2003

(51) Int. Cl.[7] .............................................. H04B 10/08
(52) U.S. Cl. .............................. 398/27; 398/26; 398/33
(58) Field of Search ................................ 359/110, 117, 359/118, 119, 124; 385/24; 398/14, 26, 27, 33, 34

(56) References Cited

U.S. PATENT DOCUMENTS

| | | | | |
|---|---|---|---|---|
| 5,412,652 A | * | 5/1995 | Lu | 370/85.12 |
| 5,717,795 A | * | 2/1998 | Sharma et al. | 385/24 |
| 5,784,184 A | * | 7/1998 | Alexander et al. | 359/125 |
| 5,959,749 A | * | 9/1999 | Danagher et al. | 359/124 |
| 6,115,157 A | * | 9/2000 | Barnard et al. | 359/124 |
| 6,147,785 A | * | 11/2000 | Mizrahi | 359/124 |
| 6,169,616 B1 | * | 1/2001 | Cao | 398/9 |
| 6,233,074 B1 | * | 5/2001 | Lahat et al. | 359/118 |
| 6,278,536 B1 | * | 8/2001 | Kai et al. | 398/79 |

* cited by examiner

Primary Examiner—Leslie Pascal
Assistant Examiner—Dzung Tran
(74) Attorney, Agent, or Firm—Kent Daniels; Ogilvy Renault

(57) ABSTRACT

Performance monitoring and equalization of DWDM optical links equipped with optical add/drop multiplexers (OADMs) at one or more sites is effected by selecting a direction of transmission and the end sites from the point of view of equalization.

Performance monitoring and equalization of DWDM optical links equipped with optical add/drop multiplexers (OADM) is presented in this application. This approach in involves conceptually converting a multiple ends system to a "two-end" system with analogous channels (AC) to simplify the network management and equalize the DWDM channel performance. All analogous channels are treated as originating at a source analogous end and terminating at a destination analogous end for the purpose of equalization. The input power for all ACs, is adjusted at the source AE to obtain equal channel performance at the destination AE.

11 Claims, 13 Drawing Sheets

ANALOGOUS CHANNEL METHOD FOR PERFORMANCE MONITORING AND EQUALIZATION IN OPTICAL NETWORKS

BACKGROUND OF THE INVENTION

1. Field of the Invention

This invention is directed to a method for performance monitoring and equalization of wavelength division multiplexed (WDM) optical networks with optical add/drop multiplexers (OADM).

2. Background Art

Performance monitoring and equalization is one of the key issues in the development of optical dense DWDM (wavelength division multiplexed) networks. In the last decade, transmission rates of data signals have increased progressively, which demands faster and more complex transmission systems.

To increase the capacity of transmission using the existing fiber plant, many optical network providers adopted WDM/DWDM technology. On the other hand, for high transmission rates, i.e. rates over 40 or 80 Gb/s, system performance degradation caused by noise and optical path distortions are usually difficult to measure, making the performance evaluation complicated.

In optically amplified WDM/DWDM system, signals travelling on different channels have a different gain and a different signal-to-noise ratio due to the unflat gain profile of the optical amplifiers provided along the path of the signal, different parameters of the transmitter-receiver pairs, optical distortion, etc.

The bit error rate (BER) and the optical signal-to-noise ratio (OSNR) have usually been used as parameters for the evaluation of the characteristics of an optical fiber communication system.

BER is defined as the ratio between the number of the erroneously received bits to the total number of bits received over a period of time. The BER includes information on all impairments suffered by the signal between the transmitter and receiver, i.e. both noise and distortion information. OSNR represents the noise characteristics of an optical system and is the ratio between the signal and noise levels.

Individual channels generally experience different OSNR and BER, even if the input power is equal at the transmitter site. This is because the transmitter-receiver pairs do not have identical characteristics for all channels, the optical amplifiers have unflat gain and noise profiles, the passive components connected over the transmission link have wavelength-dependent characteristics. etc. Moreover, the active and passive network elements have different characteristics, further contributing to the differences between the performance of the respective transmission channels.

It is important to detect accurately the performance of individual optical channels for many reasons, including improved control of optical amplifiers, signal tracking at the optical layer, monitoring accumulation of optical noise in a link with cascaded amplifiers. and most importantly, equalization of the channelperformance. Without equalization, some optical channels may have much more tolerance to noise and loss than others, which may fail to meet the provisioned performance parameters.

Equalization based on OSNR is a straight-forward method. OSNR may be measured using an optical spectrum analyser or other methods. The drawback associated with this method is that it does not consider the effects of the optical distortion and electrical noise.

Another method used currently for equalization is based on measuring the BER margin for each channel. While equalization based on BER margin is generally more sophisticated, it is more accurate than OSNR method. BER margin can be measured using, for example, "noise loading" method disclosed in U.S. patent application Ser. No. 08/934, 969 (Khaleghi, filed Sep. 19, 1997 and assigned to Northern Telecom Limited).

The article "Equalization in amplified WDM lightwave transmission systems", A. R. Chraplyvy et al., IEEE Photonics Technology Letters, Vol. 4, Nov.8, 1992, pp920–922 and U.S. Pat. No. 5,225,922 (issued on Jul. 6, 1993 to Chraplyvy et al., and assigned to AT&T Bell Laboratories) provides a method for adjusting the optical powers at the transmitter end of a WDM transmission link to obtain the same OSNR for all channels at the receiver end. The adjustment of a particular channel takes into account the total power of all channels and the end-to-end gain for that channel normalized by the end-to-end gain for all channels. A telemetry link is necessary for conveying the measurements between the two ends of the link.

Latest advances in the opto-electronics have been conducted towards the replacement of electrical add/drop multiplexers (ADM) with optical ADMs (OADMs), where an entire optical channel is dropped or added at the OADM site according to the wavelength. As OADMs are transparent to the signal rate, they can be used in DWDM networks with different SONET/SDH rates.

Performance monitoring and equalization of optical links with multiple OADMs becomes more challenging also because a wavelength can be reused in the same link. Furthermore, the OADMs are installed at locations specified by the customer.

It is known to use the "glass-through" method in end-to-end systems provided with a small number of OADMs This method involves short-connecting the drop and add ports of the OADM with a fiber patch cord, so that they appear as a single channel from an equalization point of view. The equalization of the channels is then performed generally based on OSNR or BER margin. After equalization, the patchcord between the add and drop ports is removed and the affected channels are reconnected to their respective transmitter and receiver. Since, the "glass through" method ignores entirely the existence of the OADM from the point of view of performance monitoring, after equalization. the add/drop channels will most probably have much more margin-to-failure than the other channels. Furthermore, this method cannot be used for systems that have asymmetric OADMs, where the signal is added or dropped only, or the number of add and drop signals is not equal, or systems where the wavelength of the add and drop channels are different.

The above prior art methods fall short in providing a reliable solution for monitoring the performance as well as equalizing the channels of WDM or DWDM systems equipped with OADMS.

SUMMARY OF THE INVENTION

An object of the present invention is to provide a method for performance. monitoring and equalization of networks with OADMs that alleviates totally or in part the drawbacks of current methods.

Another object of the invention is to provide a performance monitoring and equalization method that may be used for networks with symmetric or asymmetric OADMs and networks where the wavelength of the drop and add channels are equal or not.

A further object of the invention is to provide methods for performance monitoring and equalization of OADM networks that treat a complex WDM network as a "two-end" system. This allows for simplifying the monitoring of the network, as the performance information for all physical sites of the network is available at these two ends.

Accordingly there is provided a method for performance monitoring and equalization of an optical link between two line terminating equipment (LTE/REGEN) sites of an optical network provided with one or more sites equipped with optical add/drop multiplexers (OADMs) and multi-channel optical amplifiers (MOA), comprising: selecting a direction of transmission and accordingly defining one of the LTE/REGEN sites as a source analogous end (AE) and the other as a destination AE; converting the optical link into an analogous system of J analogous channels (AC), an AC(j) originating at the source AE and terminating at said destination AE; and, adjusting the input power of each AC(j) to obtain a substantially equal performance parameter for all ACs, where J>2,j is the identifier of an AC, and j∈[1,j].

An advantage of this method is that it provides a reliable equalization method for a WDM/DWDM network equipped with OADMs that could be used in the field.

Another advantage of the invention is that it provides a simple solution for performance monitoring from the network management point of view. Thus, OAM&P (operations, administration, maintenance and provisioning) information for an entire network comprised between two sites of interest is available at these two sites/ends.

Still another advantage of the method according to the present invention is that it can used in for equalization of networks provided with symmetric or asymmetric OADMs and also in cases when the add and drop channels have different wavelengths.

BRIEF DESCRIPTION OF THE DRAWINGS

The foregoing and other objects, features and advantages of the invention will be apparent from the following more particular description of the preferred embodiments, as illustrated in the appended drawings, where:

FIG. 1(a) shows a filter-based symmetrical OADM, FIGS. 1(b) and 1(c) show filter-based asymmetrical OADM and FIG. 1(d) illustrates an OADM build with fiber grating and optical circulators;

DESCRIPTION OF THE PREFERRED EMBODIMENT

Figure 1:
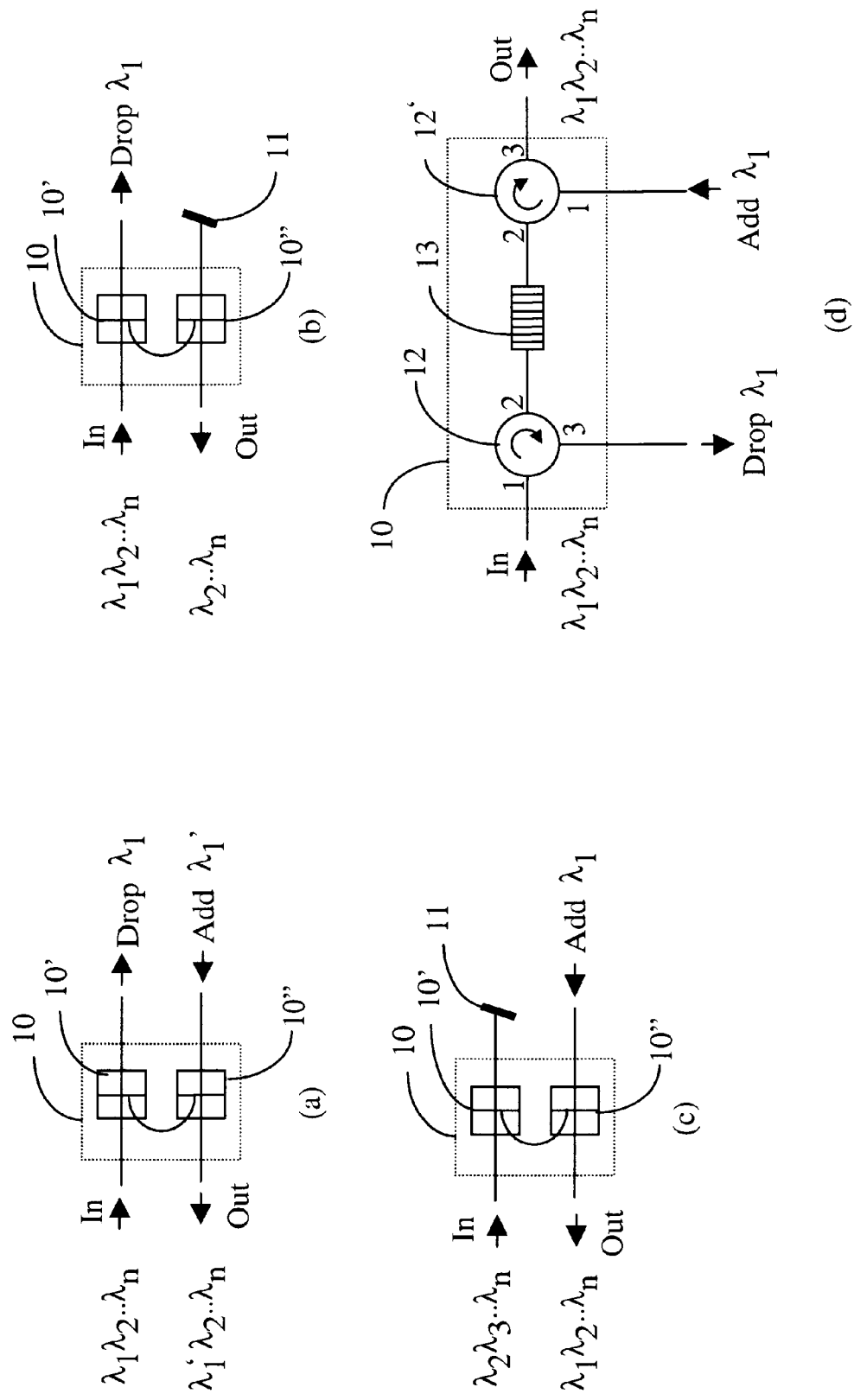
FIGS. 1a-d (Prior Art) show various types of OADMs.

FIG. 1 illustrates various types of optical add-drop multiplexers (OADM), which have been lately used for accessing a multichannel optical signal without conversion to electrical signals. FIG. 1(a) shows a symmetrical OADM 10 comprising filters 10'and 10''. Filter 10' reflects channels $\lambda_2-\lambda_n$ from the input multichannel signal presented at input port In of the OADM towards filter 10''. and transmits channel $\lambda_1$ to the output port Drop. An add channel $\lambda_1$' is presented to Add port and directed to filter 10''. Filter 10'' reflects channels $\lambda_2-\lambda_n$ towards the output port Out, and also transmits channel $\lambda_1$' to port Out, so that the output signal comprises the reflected and the inserted wavelengths $\lambda_1$', $\lambda_2-\lambda_n$. The wavelength $\lambda_1$ and $\lambda_1$' could be equal or not.

FIG. 1(b) shows an asymmetrical OADMs. where a channel $\lambda_1$ is dropped and no channel is added. Fiber terminator 11 prevents the reflection of the signal, back to the fiber link. FIG. 1(c) also shows an asymmetrical OADMs, where a channel $\lambda_1$ is added and no channels are dropped, shown by fiber terminator 11 provided at the Drop port.

FIG. 1(d) illustrates an OADM build with three-port optical circulators 12 and 12', and a fiber grating 13. In this example, the dropped and added channels have the same wavelength $\lambda_1$.

Figure 2A:
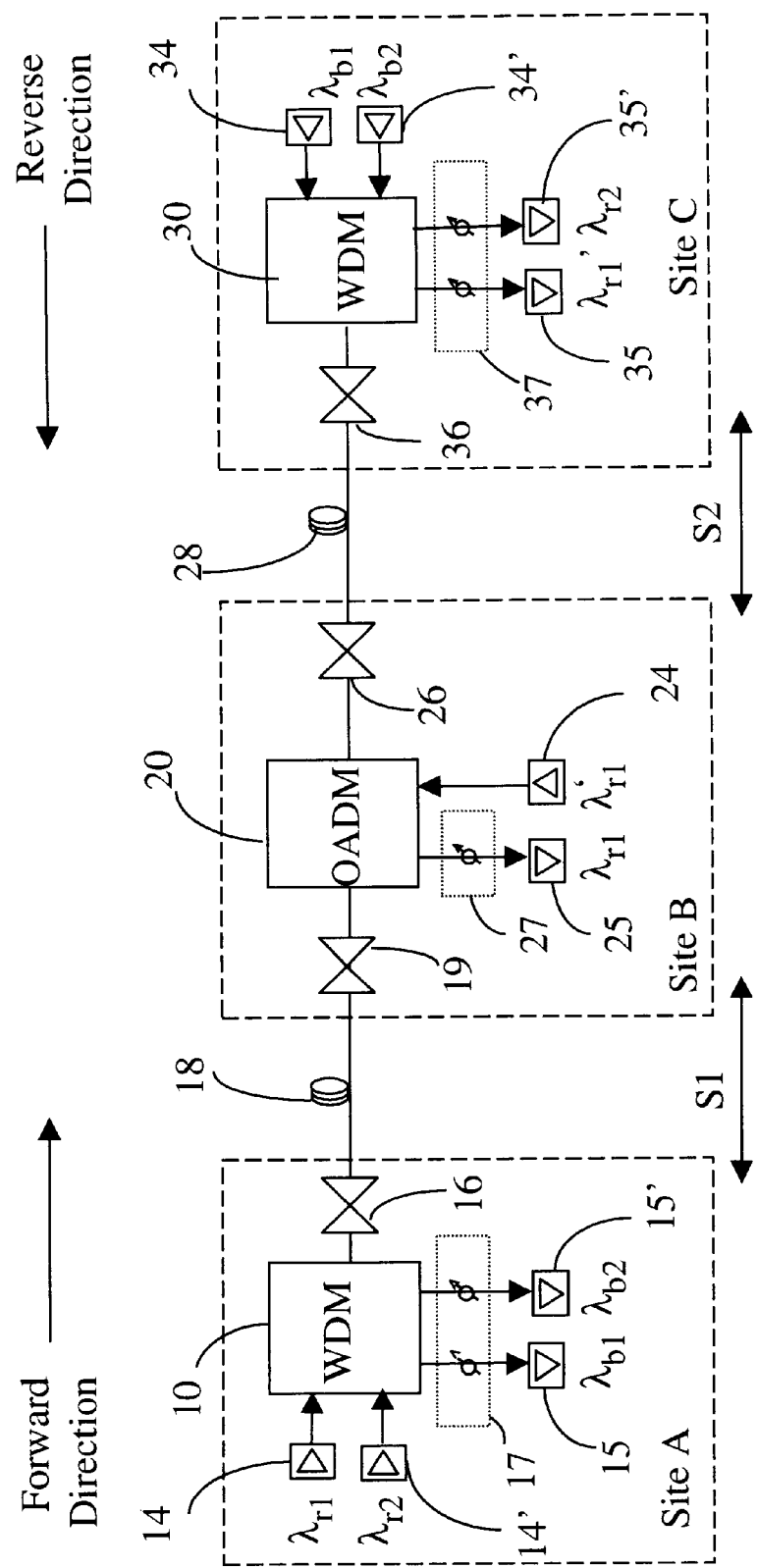
FIG. 2A is an example of a bidirectional communication network comprising optical amplifiers and OADMs.

FIG. 2A shows an example of a simple bidirectional DWDM network connecting sites A, B and C, and is used to define some terms used in this specification.

The term "optical span" defines the optical connection between two pieces of section terminating equipment (STE) located at two different sites. STE includes a regenerator (REGEN), an optical amplifier (OA), or a piece of line terminating equipment (LTE). For example, the fiber between site A and site B, denoted with numeral 18 on FIG. 2A is a span. Another span shown on this Figure is denoted by numeral 28.

The term "optical channel" refers to the path of a signal of a given wavelength between the respective transmitter and receiver for that wavelength. An optical span can carry a plurality of channels. For example, two optical channels $\lambda_{r1}$ and $\lambda_{r2}$ are present along span 18 to transport two different signals in one direction, and two optical channels $\lambda_{b1}$ and $\lambda_{b2}$ are present along the same span 18 to transport two more signals in the opposite direction.

The type of optical channels can be defined in complex networks with respect to two selected end sites of the optical link as "express", "add", "drop" and "add-drop" channels. An "express channel" is an optical channel that bypasses all OADMs between the LTE/REGEN sites, i.e. between the physical ends of the network. As the name indicates, an "add" channel has the transmitter at an OADM site, a "drop" channel has the receiver at an OADM site, and an "add/drop" channel has the transmitter and the receiver at different OADM sites.

The term "analogous end (AE)" is used in connection with an optical network to define two sites of interest from the point of view of equalization, that are located at two physical ends equipped with a LTE/REGEN. As such, the analogous ends are accessible to the network manager, so that equalization may be performed remotely.

To convert a network into a two-ends analogous channel system according to this invention, all channels are converted to "analogous channels (AC)". An analogous channel is an abstraction for defining the path of a signal of a given wavelength between an end site (a LTE/REGEN site) and an OADM site, or between two OADM sites, as viewed with respect to the analogous ends. This term is meaningful only in conjunction with all the analogous channels that can be abstracted between the respective analogous ends.

From a network management point of view, it can be assumed that an analogous channel comprises, in addition to the spans of "real" fiber, spans of "lossless" fiber that complete the link between the physical ends of the respective optical channel and the analogous ends.

The arrows noted "forward direction" and "reverse direction" are provided on the drawings for specking the directions of transmission. It is to be understood that these are relative terms, which apply as such to the particular example of networks illustrated in the appended drawings. In addition, in the examples illustrated and described in this specification, the channels travelling in the forward direction are selected in the red band of the spectrum, while the reverse channels are selected in the blue band. Other associations are equally covered by this invention, and also the forward and reverse bands are not limited to the red and respective blue bands.

Table 1 lists the acronyms for some of the terms used for describing the AC methods for performance monitoring and equalization.

TABLE 1

| # | Name | Acronym |
|---|---|---|
| 1 | Analogous Channel | AC |
| 2 | Analogous End | AE |
| 3 | Bit Error Rate | BER |
| 4 | Code Violations | CV |
| 5 | Dispersion Compensation Module | DCM |
| 6 | Error Seconds | ES |
| 7 | Line Terminating Equipment | LTE |
| 8 | Multiwavelength Optical Amplifier | MOA |
| 9 | Network Manager | NM |
| 10 | Optical Add/Drop Multiplexer | OADM |
| 11 | Optical Signal-to-Noise Ratio | OSNR |
| 12 | Performance Monitor (NM term) | PM |
| 13 | Receiver, Transmitter | Rx, Tx |
| 14 | Ratio Indicator (CV/ES) | R |
| 15 | Regenerator | REGEN |
| 16 | First Threshold (OSNR method) | TH1 |
| 17 | Second Threshold (BER margin method) | TH2 |
| 18 | Variable Optical Attenuator | VOA |

The network of FIG. 2A shows only two channels in each direction of transmission, but the invention is equally applicable to more than two forward and two reverse channels, and also to networks having a different number of forward and reverse channels.

FIG. 2A shows at site A, a WDM 10, a transmitter unit including transmitters (Tx) 14 and 14', and a receiver unit including receivers (Rx) 15 and 15', and attenuators 191, 192.

Each transmitter 14, 14' transmits a client signal using an optical carrier of a respective wavelength $\lambda_{r1}$, $\lambda_{r2}$. Each receiver 15, 15' detects a client signal carried by an optical carrier of a respective wavelength $\lambda_{b1}$, $\lambda_{b2}$.

Index "r" indicates that the respective wavelength is selected in the red band of the light spectrum, "b" indicates that the wavelengths are selected in the blue band of the light spectrum, while "1" or "2" gives the identifier of a channel in the respective direction/band.

WDM 10 combines the forward optical channels $\lambda_{r1}$ and $\lambda_{r2}$ into a bidirectional multichannel optical signal S1 and delineates the reverse optical signals $\lambda_{b1}$ and $\lambda_{b2}$ from S1.

A variable optical attenuator (VOA) 17 is also provided at site A for adjusting the power of each signal arriving at receiver 15 and respectively receiver 15'.

FIG. 2A also shows bidirectional multi-wavelength optical amplifier (MOAS) 16 provided for optically amplifying the forward channels of S1 (in the postamplifier module), before insertion on span 18, and also for optically amplifying the reverse channels of signal S1 (in the preamplifier module), before arriving at the site A.

At site B, the forward channels of signal S1 are amplified by MOA 19 and passed to an OADM 20. In the forward direction, OADM 20 drops the optical signal of wavelength $\lambda_{r1}$ to a receiver 25 and inserts (adds) a new client signal of wavelength $\lambda_{r1}'$, received from a transmitter 24. Channel $\lambda_{r2}$ passes through the OADM; it is an express channel. Since in a general case, $\lambda_{r1}'$ may not be equal to $\lambda_{r1}$, the multichannel optical signal travelling between sites B and C over span 28 is denoted here with S2. In the reverse direction, both channels $\lambda_{b1}$, $\lambda_{b2}$ pass through site B towards site A. $\lambda_{b1}$ and $\lambda_{b2}$ are also express channels.

Receiver 25 is provided with a VOA 27 for adjusting the received power. A MOA 26 is provided at site B for optically amplifying the forward channels of S2 after leaving site B, and also for optically amplifying the reverse channels of signal S2, before arriving at the site B.

At site C, forward channels of S2 are amplified by a MOA 36 and presented to a WDM 30, which directs channel $\lambda_{r1}'$ to a receiver 35, and channel $\lambda_{r2}$ to a receiver 35'. Reverse channels $\lambda_{b1}$ and $\lambda_{b2}$ originating at transmitters 34 and respectively 34', are multiplexed by OADM 30 and sent towards site B over span 28, after amplification by MOA 36.

The basic idea of this invention is to construe the network between two sites of interest as an analogous channel system comprised of a plurality of end-to-end analogous channels (AC). This implies selecting the respective end sites of interest from the point of view of equalization, and determining all Tx-Rx pairs at, and between these sites. The sites are defined as a "source AE" and a "destination AE", respectively, in accordance with the direction of transmission in which equalization is performed.

When the physical ends of an optical channel coincide with the physical ends of the network, i.e. the transmitter and receiver of the respective channel are at a respective LTE/REGEN site, the analogous channel is identical with the optical channel. This is the case of express channels. When the physical ends of an optical channel do not coincide with the physical ends of the network, the transmitter and/or receiver for the respective physical channel are/is "moved" to the respective source and, destination AE, and "lossless" fiber is assumed between the respective physical end and the analogous end.

Figure 2B:
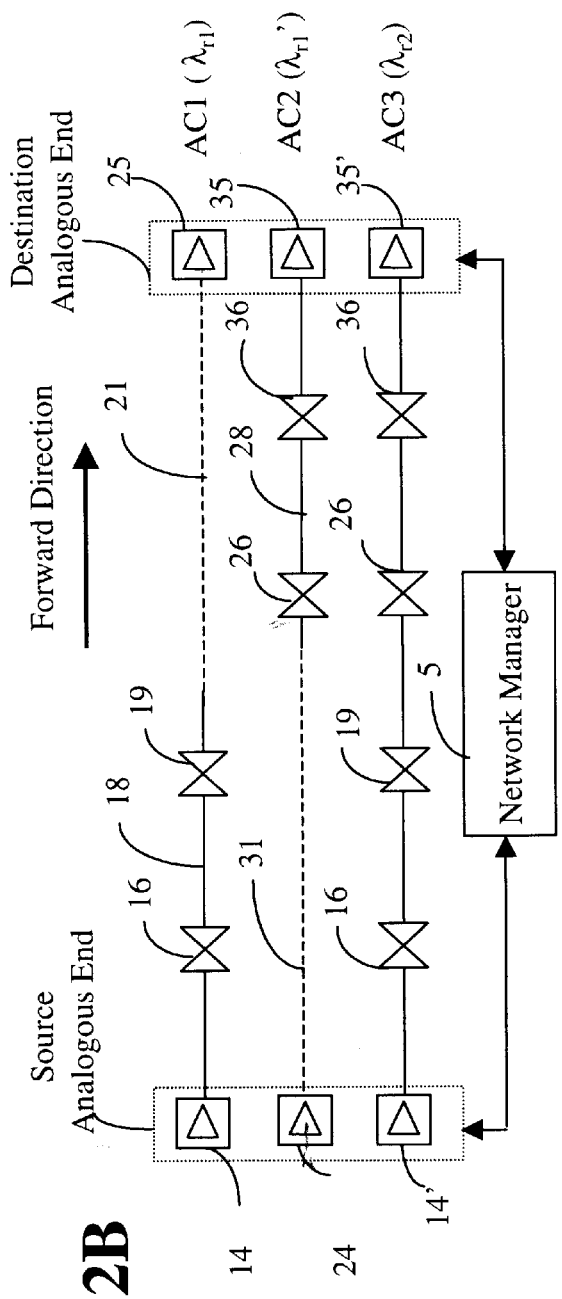
FIG. 2B shows how the network of FIG. 1A is separated into forward analogous channels.
Figure 2C:
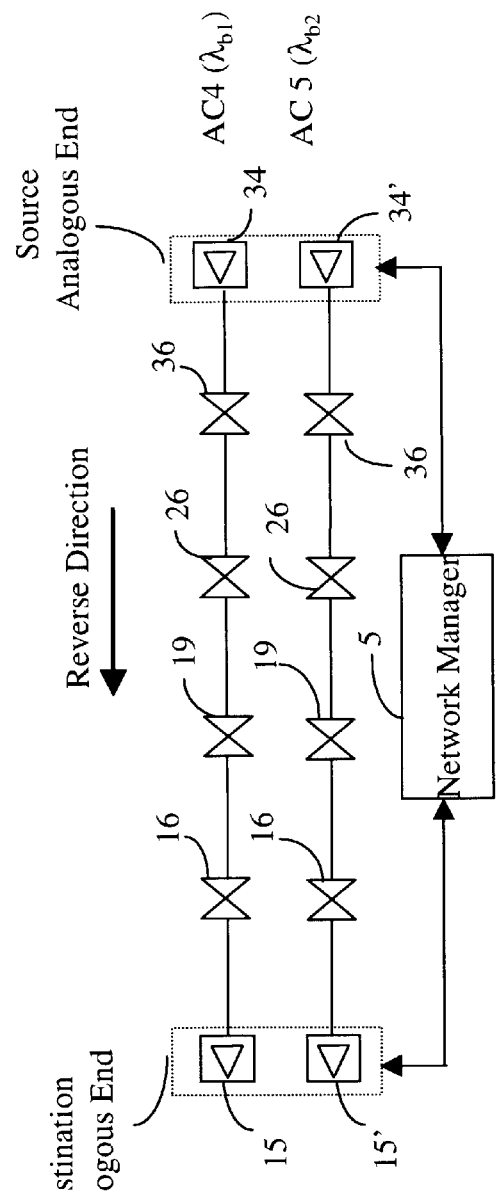
FIG. 2C shows how the network of FIG. 1A is separated into reverse analogous channels.

The network of FIG. 2A can thus be converted to the ACs shown in FIGS. 2B and 2C. Thus, AC1 carrying the forward channel of wavelength $\lambda_{r1}$, comprises Tx 14, MOA 16, fiber 18, MOA 19 and Rx 25. Since the source analogous end coincides with the location of Tx 14. namely is at site A, the physical channel also coincides with the analogous channel between site A and MOA 19 at site B. However, since FR 25 is not located at the destination analogous end, but at site B, Rx 25 is displaced on FIG. 2B at the destination analogous end, i.e. at site C. The dotted connection 21 between MOA 19 and Rx 25 is considered "lossless" fiber.

AC2 carries the forward channel of wavelength $\lambda_{r1}'$, and comprises Tx 24, MOA 26, fiber 28, MOA 36 and Rx 35. Since the destination analogous end coincides with the location of Rx 35, namely is at site C, the physical channel also coincides with the analogous channel AC2 between MOA 26 at site B and Rx 35 at site C. Tx 24 is displaced on FIG. 2B from site B to the source analogous end (site A) and the doffed connection 31 between Tx 24 and MOA 26 is considered "lossless" fiber. AC1 and AC2 have one end at an analogous end, and therefore one segment of "lossless" fiber, 21 and respectively 31, is assumed between the respective OADM and the respective analogous end. it is to be understood that more than one segment of imaginary "lossless" fiber may be needed to complete an AC of a complex network as it is shown in connection with the example of FIGS. 3A-3C.

Figure 3A:
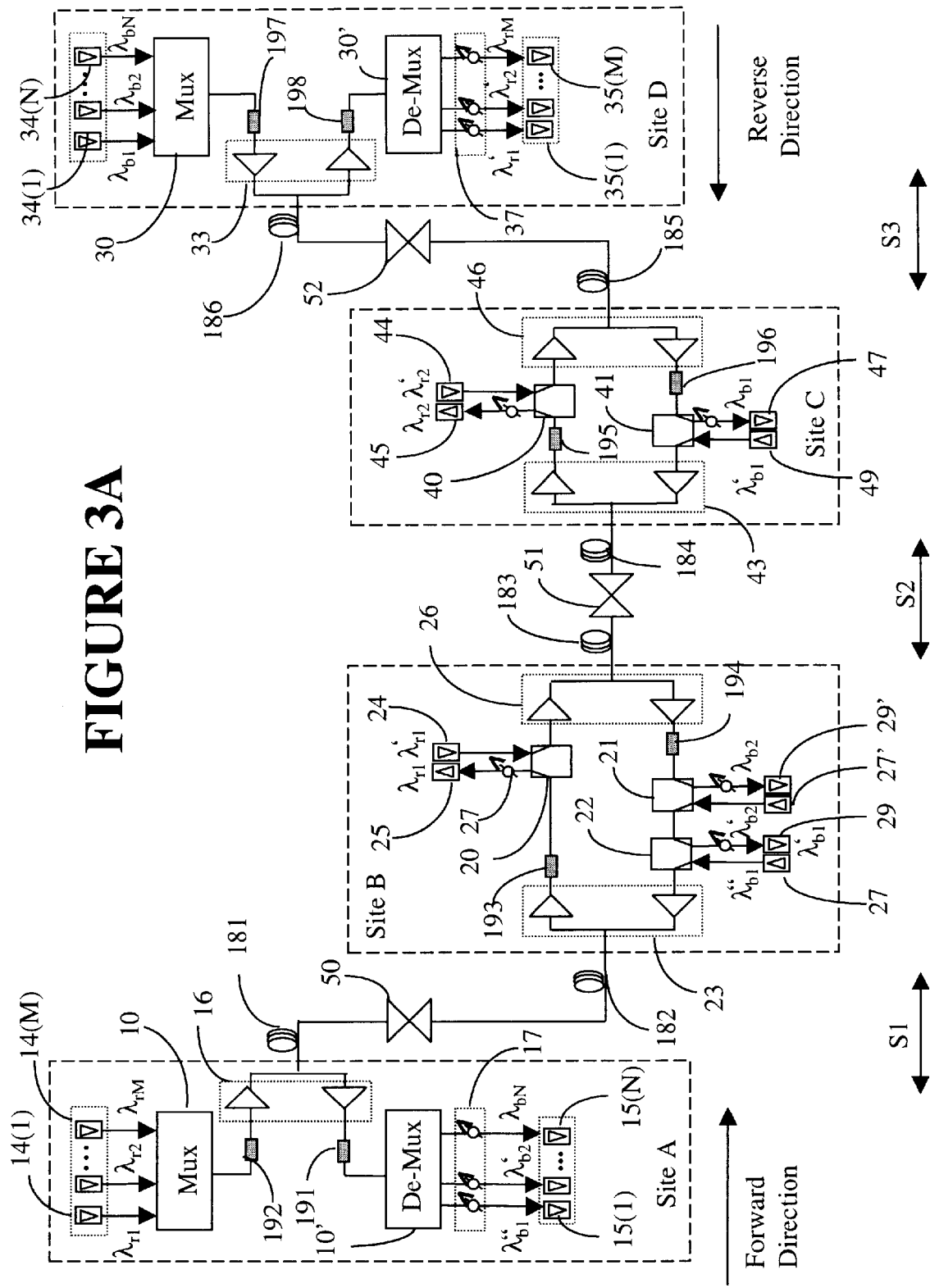
FIG. 3A is an example of a complex bidirectional DWDM network comprising optical amplifiers and OADMs.

FIG. 3A shows a more complex transmission network, connecting sites A, B, C and D. The multichannel signal travelling between sites A and B on fiber spans 181 and 182 is denoted with S1, the signal travelling between sites B and C on fiber spans 183 and 184, is denoted with S2 and the signal travelling between sites C and D on spans 185 and 186, with S3. FIG. 3A shows bidirectional multichannel optical amplifiers (MOAs) 50, 51 and 52 connected onto these spans, but is to be understood that a span may comprises more line optical amplifiers or none may be connected between two adjacent sites, depending on the particular configuration of the network under equalization.

Site A comprises a plurality M of transmitters 14(1) to 14(M), each for generating a forward optical carrier $\lambda_{r1}$ to $\lambda_{rM}$, and a multiplexer 10 for combining the forward channels into optical signal S1. Postamplifier module of a MOA 16 amplifies the forward channels of signal S1. Site A is also provided with a plurality N of receivers 15(1) to 15(N), each for a reverse optical carrier $\lambda_{b1}"$, $\lambda_{b2}'$ and $\lambda_{b3}$ to $\lambda_{bM}$, and a demultiplexer 10' for separating the reverse channels from signal S1. The reverse channels are also amplified before separation by the preamplifier module of MOA 16.

A VOA unit 17 is provided at site A for independently adjusting the level of the signals at the input of the receivers, and also with dispersion. compensation modules (DCM) or optical attenuators 191 and 192, as is well known in the art.

Site D comprises transmitters 34(1) to 34(N) for reverse channels $\lambda_{b1}$ to $\lambda_{bN}$, receivers 35(1) to 36(M) for forward channels $\lambda_{r1}'$, $\lambda_{r2}'$ and $\lambda_{r3}$ to $\lambda_{rM}$, multiplexer 30, demultiplexer 30', and MOA 33. DCM or optical attenuators 197, 198, and a VOA unit 37 are also provided for the same reasons as disclosed above.

Sites B and C are OADM sites, where some channels are dropped and some added. As indicated above, the wavelength of a channel added at a site may, or may not, be the same with that of a dropped channel. An OADM 20 at site B drops channel $\lambda_{r1}$ from S1 and adds a new signal over a forward channel $\lambda_{r1}'$. Site B is also provided with two OADMs 21 and 22, each for dropping and adding a channel in the reverse direction. Thus, OADM 21 drops channel $\lambda_{b2}$ and adds a new signal over channel $\lambda_{b2}'$, and OADM 22 drops a channel $\lambda_{b1}'$ and adds a new channel $\lambda_{b1}"$.

Site B is also equipped with a MOA 23 comprising a post and pre amplifying module for amplifying respectively the forward and the reverse channels of S1, and with a MOA 26 for amplifying the respective forward and the reverse channels of S2. Each receiver 25, 29 and 29' is provided with a VOA (not marked) for adjusting the input power and with DCM or optical attenuators 193, 194.

Site C is equipped with an OADM 40 that drops channel $\lambda_{r2}$ from S2 and adds anew signal using a forward channel $\lambda_{r2}'$. An OADM 41, also located at site C, accesses the reverse channels of S3 to drop channel $\lambda_{b1}$ and to add a new signal over channel $\lambda_{b1}'$. Each receiver 45 and 47 is provided with a VOA (not marked) for adjusting the input power and with DCM or optical attenuators 195, 196. The sites of interest from the equalization point of view are LTE/REGEN sites A and D; therefore the analogous ends are at these sites. Site A is the source AE for the equalization of forward channels, and the destination AF for equalization of reverse channels. Similarly, site D is the source AE for the equalization of reverse channels, and the destination AE for equalization of forward channels.

The number of ACs is equal to the number of all transmitter—receiver pairs of the network.

It is to be noted that the analogous channels do not have the same number of amplifiers. This is an important difference between systems with and without OADMs.

Figure 3B:
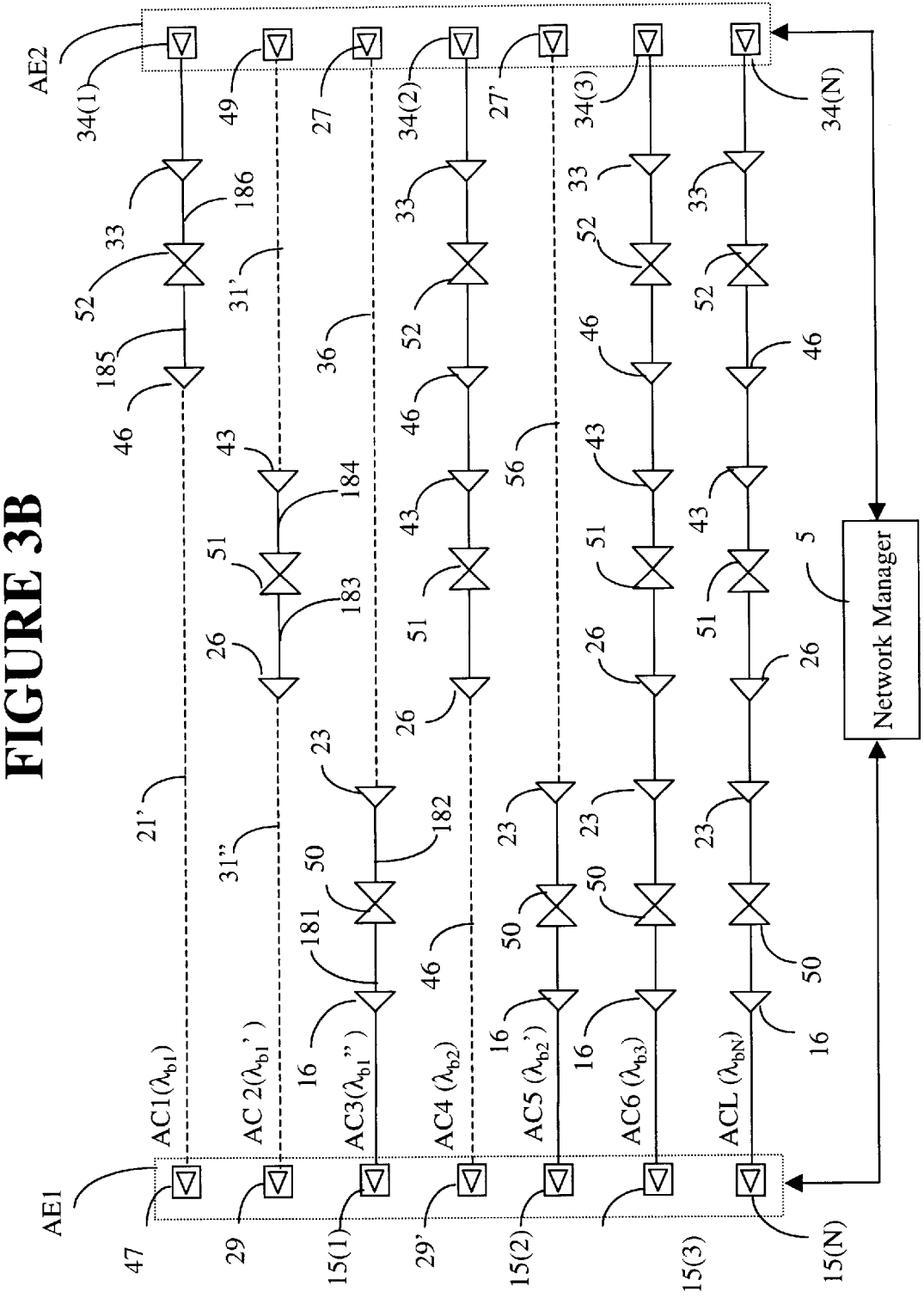
FIG. 3B shows the reverse analogous channels for the network of FIG. 3A.

The following detailed description is made in connection with the reverse (blue) channels, but it is to be understood that performance monitoring and equalization for the forward channels can be realized in the same way. The analogous links for the reverse channels are illustrated in FIG. 3B.

For the express channels, the real optical channel is identical with the analogous channel. In the example of FIG. 3A and 3B, such direct relation can be found for wavelengths $\lambda_{b3}$ to $\lambda_{bM}$. For the channels being added and dropped with wavelength reuse, the real optical link between sites A and D is divided into several analogous channels.

For example, AC1 ($\lambda_{b1}$) originates at transmitter 34 (1) at site D, which is also the source analogous end (AE) for reverse direction of transmission. and ends at receiver 47 at site C. This analogous channel includes reverse module of MOA 33, MOA 52 and reverse module of MOA 46. Receiver 47 is displaced on FIG. 3B from site C to site A, where is the destination analogous end, and a hypothetical length of "lossless" fiber 21' is assumed between MOA 46 and receiver 47.

AC2 ($\lambda_{b1}'$) originates at transmitter 49 at site C and ends at receiver 29 at site B. This channel includes reverse module of MOA 43, MOA 51 and reverse module of MOA 26. Since none of the physical ends of this AC coincide with an analogous end, transmitter 49 is displaced on FIG. 3C at the source AE, and receiver 29 is shown at the destination AE. This AC is then completed with two lengths of "lossless" fiber, namely 31' between transmitter 49 and MOA 43, and 31" between MOA 26 and receiver 29.

AC3 ($\lambda_{b1}"$) originates at transmitter 27 at site S and ends at receiver 15 (1) at site A. This channel includes reverse module of MOA 23, MOA 50 and reverse module of MOA 16. The AC is completed with lossless fiber 36 between transmitter 27 and MOA 23 Transmitter 27 is shown on FIG. 3B at the source AE.

Similar transformation of the second blue channel results in AC4($\lambda_{b2}$) and AC5($\lambda_{b2}'$), where the respective AC are completed with lossless fibers 46 and respectively 56.

Figure 3C:
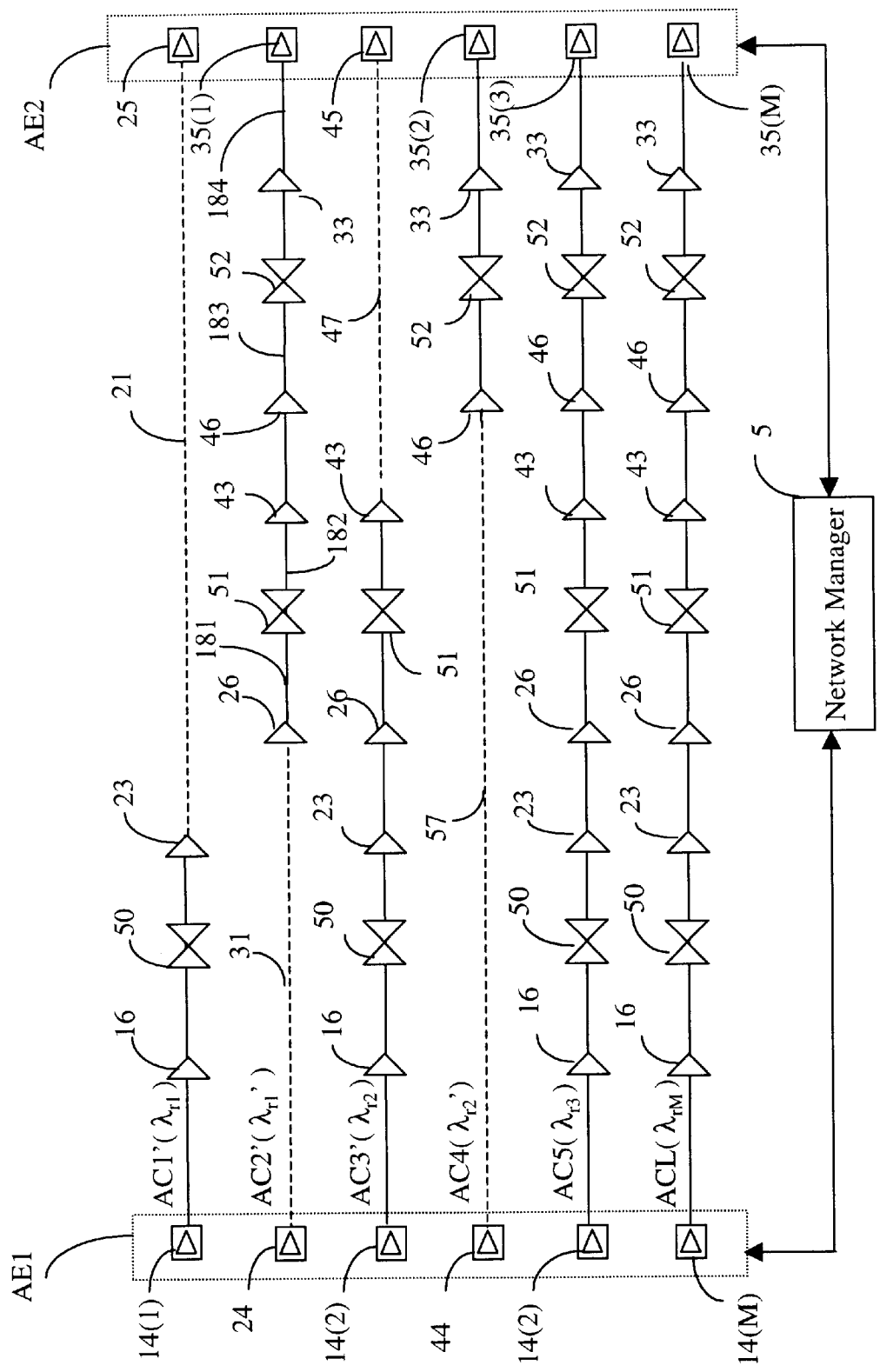
FIG. 3C shows the forward analogous channels for the network of FIG. 3A.

FIG. 3C shows the ACs for the forward direction.

Analogous Channel Method for Performance Monitoring and Channel Equalization Based on OSNR Equalization based on OSNR is disclosed in connection with FIG. 3B and FIGS. 4A-4D.

Step 100 is an initialization step, showing selection of the source and destination analogous ends (AE) and also of the direction of traffic (forward or reverse) for which the equalization is being performed. In this specification, the source AE is selected at site D and the destination AE is selected at site A, the direction of transmission for which the methods of equalization are described and illustrated being the reverse direction, from site D to site A.

Figure 4A:
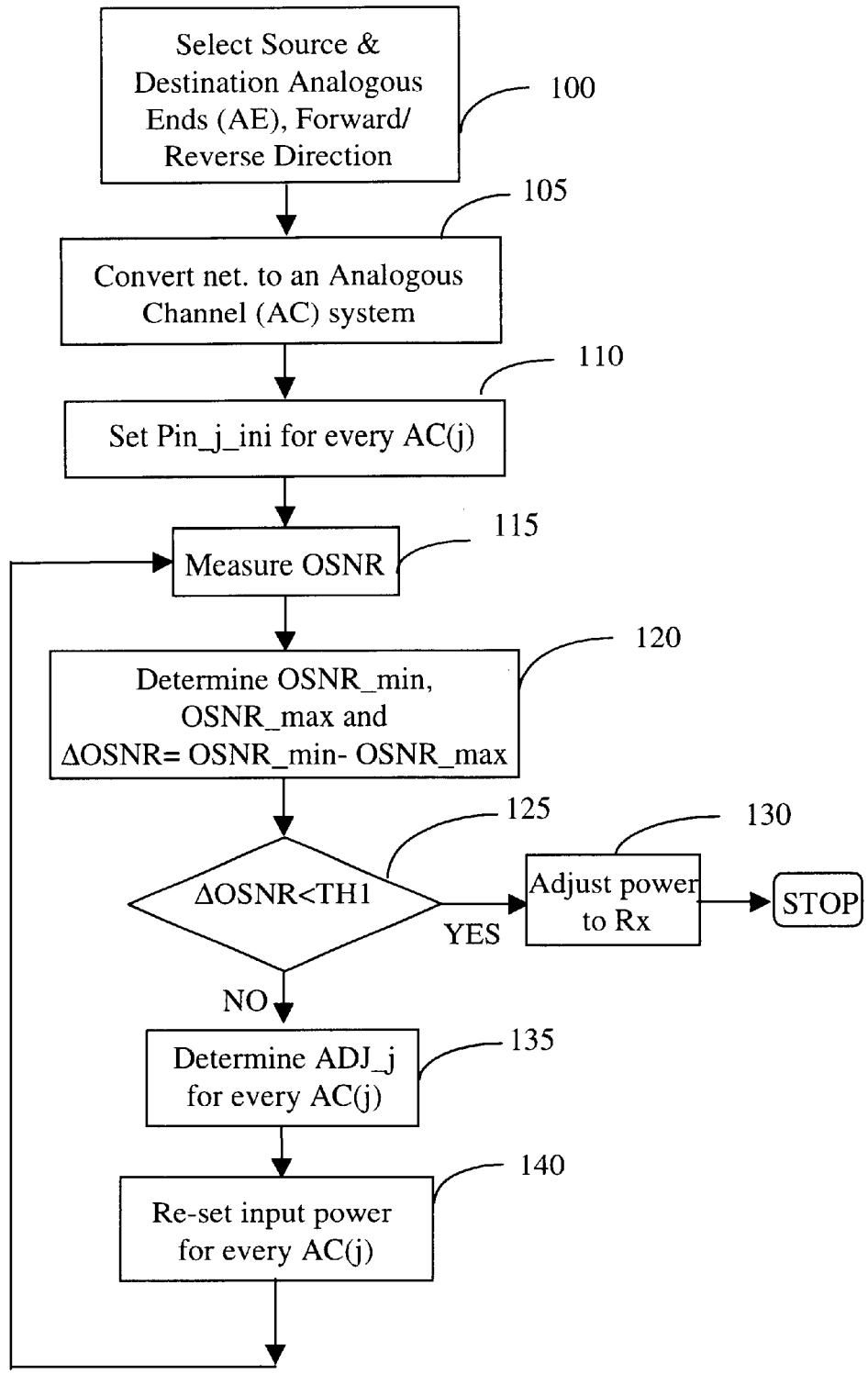
FIG. 4A is a flow-chart of the method of equalization based on OSNR.
Figure 4B:
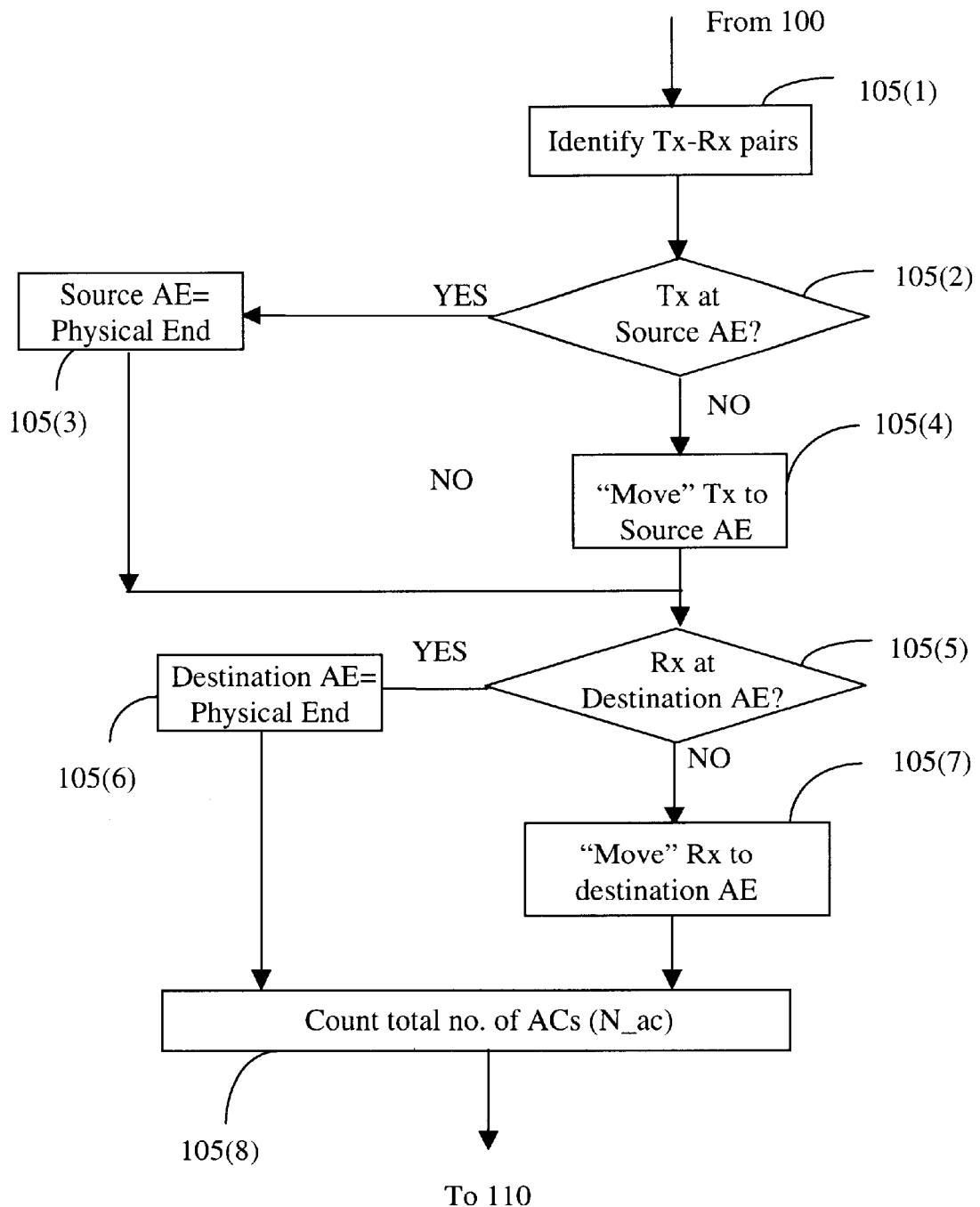
FIG. 4B illustrates the step of converting the network into a two end network of analogous channels.

In step 105, the network is converted into an analogous channel system comprising a plurality of two-end analogous channels, as shown in further detail on FIG. 4B.

To convert the physical network into ACs, all physical channels are determined, by identifying the Tx-Rx pairs for the reverse direction and the corresponding wavelength, as shown in step 105 (1). The type of channel is then determined in steps, 105(2) and 105(5) of FIG. 4B. For an express or drop channel originating at the source AE, the source AE is identical to the physical end, shown in step 105(3). If the transmitter for the channel under consideration is not at the source analogous end, the transmitter is "moved" at the source AE, shown in step 105(4). Also, all receivers are "moved" at the destination AE, step 105(5) and 105(7).

In the meantime, the total number of ACs comprised in the real optical link between sites A and D is counted and recorded as N_ac in step 105(8). In FIG. 3D, the network is converted into N+3 analogous channels.

Figure 4C:
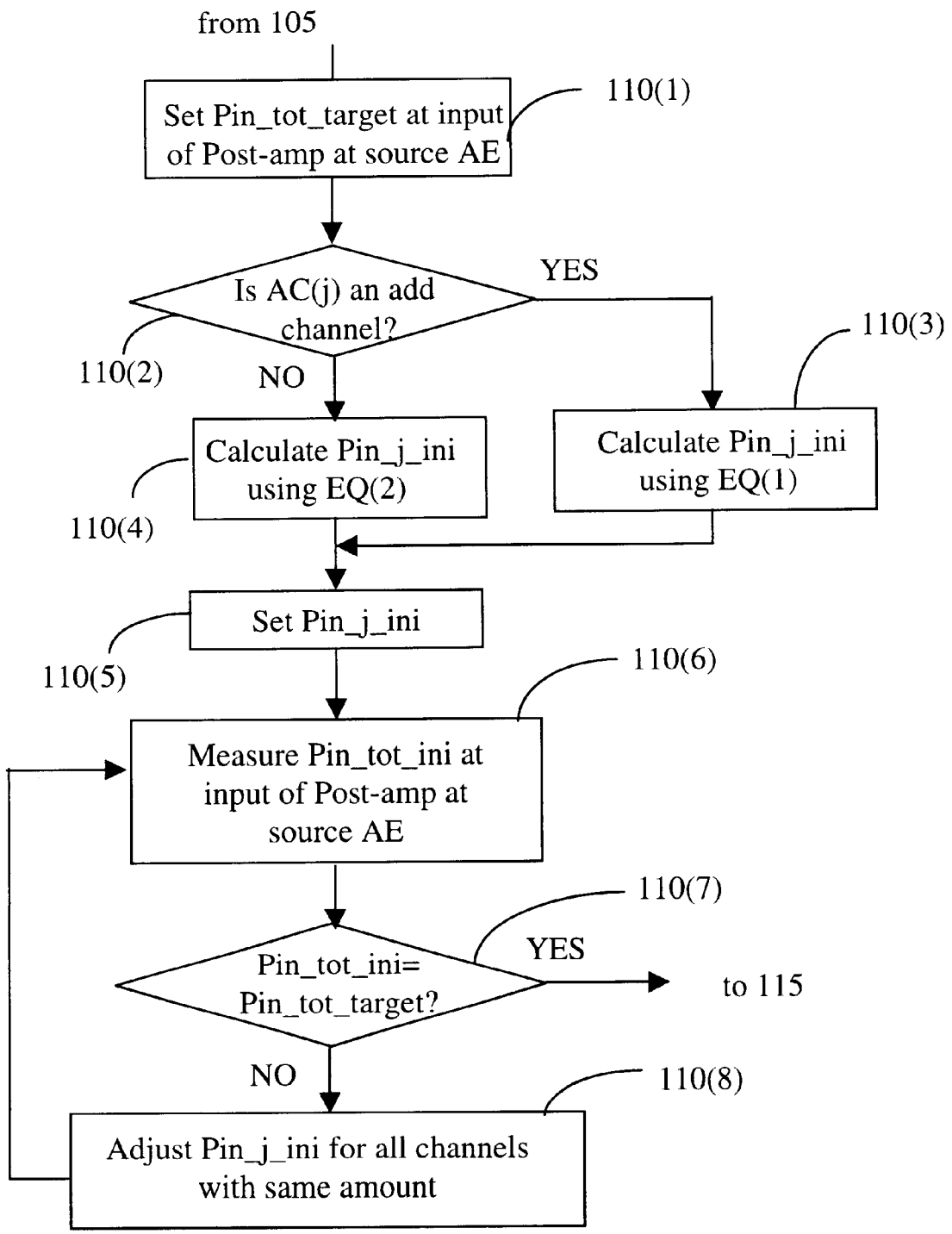
FIG. 4C illustrates the stop of setting the input power.

Returning to FIG. 4A, the initial input power Pin_j_ini_dBm is set for each AC, shown on step 110 and detailed in FIG. 4C.

In step 110(1), a target value for the total input power, denoted with Pin_tot_target_dB, is set at the input of a respective amplifier module at the LTE/REGEN site, which is in this case at the input of MOA 33.

An initial input power parameter Pin_j_ini_dBm is determined for all AC(j), where j is the range of the AC. The initial input power for the axpress and drop ACs is determined in a different way from that for the add ACs, as shown in steps 110(2), 110(3) and 110(4).

Thus, the initial power for add channels is calculated according to equation EQ(1):

$$\text{Pin\_j\_ini\_dBm} = P\text{peak} - \text{Loss\_before\_OADM} \qquad \text{EQ(1)}$$

Ppeak is a provisioned value and gives the maximum permitted output power for a given amplifier and a given channel, in FIG. 3B pre-amplifier module of MOA 33.

Loss_before_OADM is the total optical component loss measured between the output of the last optical amplifier at the OADM site where channel AC(j) is added, and before the respective OADM. For example, Loss_before_OADM for channel $AC\lambda'_{b1}$ added at site C is the optical loss between the output of the preamplifier module of MOA 46 and OADM 41, and is given by the insertion loss of DCM/optical attenuator 197. Loss_before_OADM for channel $AC\lambda''_{b1}$ added at site B is the sum of the loss given by the DCM/optical attenuator 194 and the insertion loss introduced between the IN-to OUT port of OADM 21.

If the value given by EQ(1) is higher than the maximum output power for the respective transmitter, Pin_j_ini_dBm should be set at the maximum power for the respective transmitter.

The initial power for an express and drop channel AC(j) is calculated according to equation EQ(2)

$$\text{Pin\_j\_ini\_dBM} = 10 * \log 10^{(\text{Pin\_tot\_target\_dBm}/10)/K} \qquad \text{EQ(2)}$$

where K is the number of express and drop channels (transmitters) at LTE/REGEN site, which is N in this example.

In step 110 (5) the Pin_j_ini calculated as above is set at the transmitter of each AC. The total power Pin_tot_ini is then measured in step 110(6) and compared with the target in step 110(7). If the target and the measured total powers are different, the input power for all transmitters is increased or decreased by the same amount, until the two parameters become equal, steps 110(8), 110(6) and 110(7).

Returning now to FIG. 4A, the initial value for the OSNR, denoted with OSNR_j, is measured at each receiver where the respective reverse AC terminates, as shown in step 115.

OSNR_min and OSNR_max are thereafter determined in step 120, as the minimum, maximum value, respectively of all OSNRs measured in the previous step, and the difference between these two values is denoted with ΔOSNR.

If ΔOSNR is less than a provisioned value, herein referred to as the first threshold TH1, the power at the input of each receiver is adjusted in step 130, for operation according to the specification, and the equalization is accomplished. This is shown by branch "YES" of decision block 125. The threshold TH1 is typically 1 dB, but other values may be selected for a particular network.

Figure 4D:
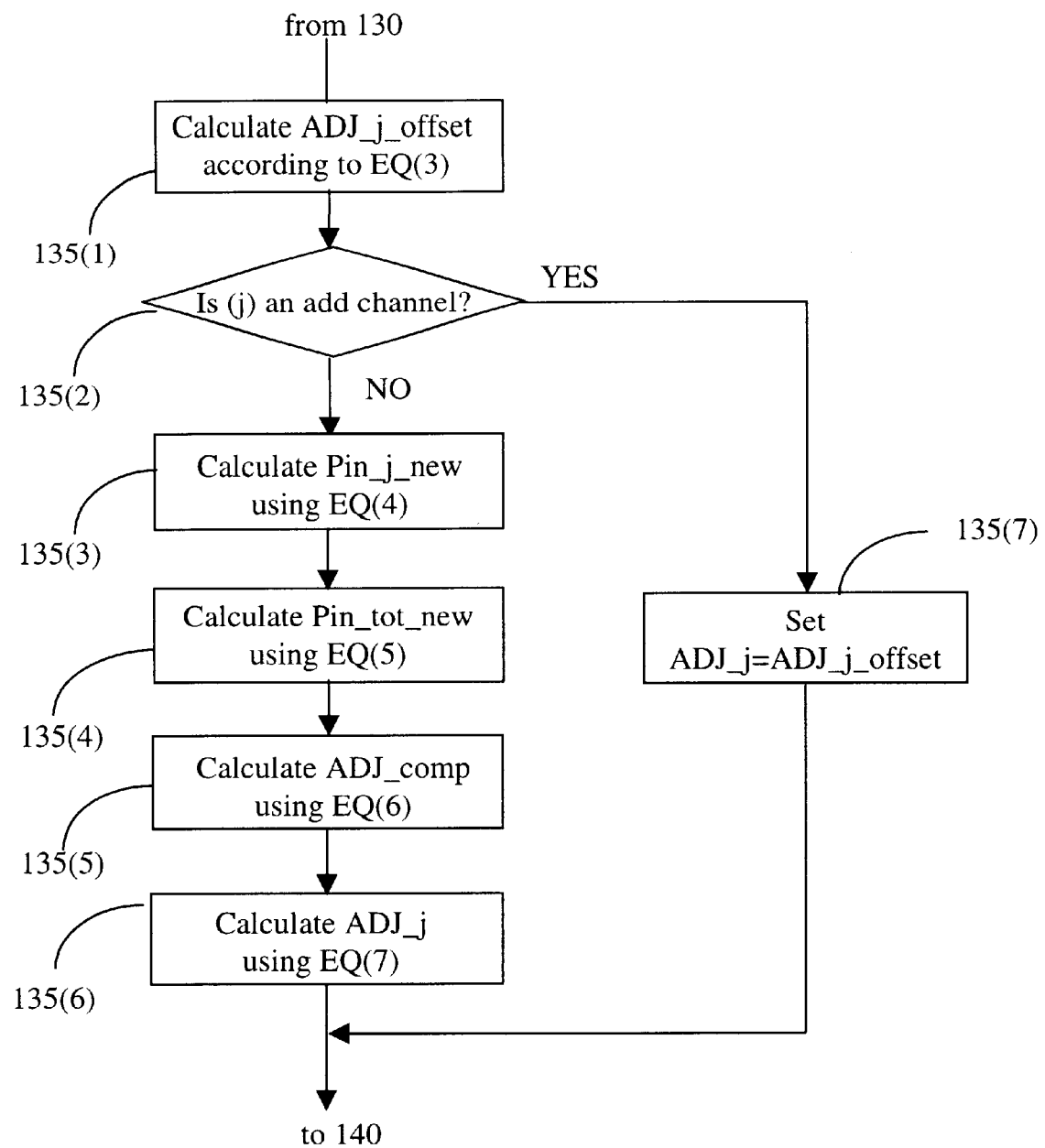
FIG. 4D illustrates the step of determining the input power adjustment.

If ΔOSNR is greater or equal to TH1, an adjustment value ADJ_j is determined in step 135, as shown in further detail in FIG. 4D. Namely, in step 135(1), the difference ADJ_j_offset between the OSNR_min and the OSNR measured in step 115 is calculated for every AC according to equation EQ(3)

$$\text{ADJ\_j\_offset} = \text{OSNR\_min} - \text{OSNR\_j} \qquad \text{EQ(3)}$$

In the case when the channel is an add channel, step 135(2), the ADJ_j is set at the value of ADJ_j_offset in step 135(7). For the remaining channels, shown by branch "NO" of decision block 135 (2), a new input power Pin_j_new is calculated in step 135(3) based on the ADJ_j_offset obtained in step 135(1), according to the equation EQ(4):

$$\text{Pin\_j\_new\_dBm} = \text{Pin\_j\_ini\_dBm} + \text{ADJ\_j\_offset} \qquad \text{EQ(4)}$$

A new total input power Pin_tot_new_dBm is calculated in step 135(4) using equation EQ(5):

$$\text{Pin\_tot\_new\_dBm} = 10 * \log(\text{SUM}(10^{(\text{Pin\_new\_i\_dBm}/10)})) \qquad \text{EQ(5)}$$

and this total power is used to determine a compensation adjustment value ADJ_comp, step 135(5), using equation EQ(6) below:

$$\text{ADJ\_comp} = \text{Pin\_tot\_new\_dBm} - \text{Pin\_tot\_target\_dBm} \qquad \text{EQ(6)}$$

Adjust value ADJ_j is determined for express and drop channels using equation EQ(7), as shown in step 135(6):

$$\text{ADJ\_j} = \text{ADJ\_j\_offset} - \text{ADJ\_comp} \qquad \text{EQ(7)}$$

Returning now to FIG. 4A, step 140, input power for all transmitters is reset using ADJ_j. ADJ_j calculated using EQ(7) is applied to all transmitters at the LTE/REGEN site to ensure an optimum total input power to the post amplifier is maintained. This adjustment value is not applied to the add channels, as can be seen from FIG. 4D, for which ADJ_j is set equal to ADJ_j_offset.

The equalization continues by repeating steps 115 to 140 until ΔOSNR becomes less than TH1 for all ACs.

Analogous Channel Method for Channel Equalization Based on BER Margin

The failure criterion is a parameter provisioned for a network at installation. In general, a failure in channel performance is considered to occur when the bit error rate (BER) is higher than $10^{-9}$, that is the failure criterion is BER_fail=$10^{-9}$. A BER lower than this value indicates an acceptable performance for the respective link. As well, the failure criterion could be set using rate R, which is the ratio between the line code violations (CV) and line error seconds (ES) for channels between two LTEs, and is the ratio between the section CV to section ES for channels between a LTE and a REGEN. A channel is considered failed when R is outside a specified range provisioned for the respective channel. The range for R depends on the signal rate for the respective channel. For networks that are equipped with a performance monitor (PM), that records CV and ES R may be calculated or read on the PM screen.

Figure 5A:
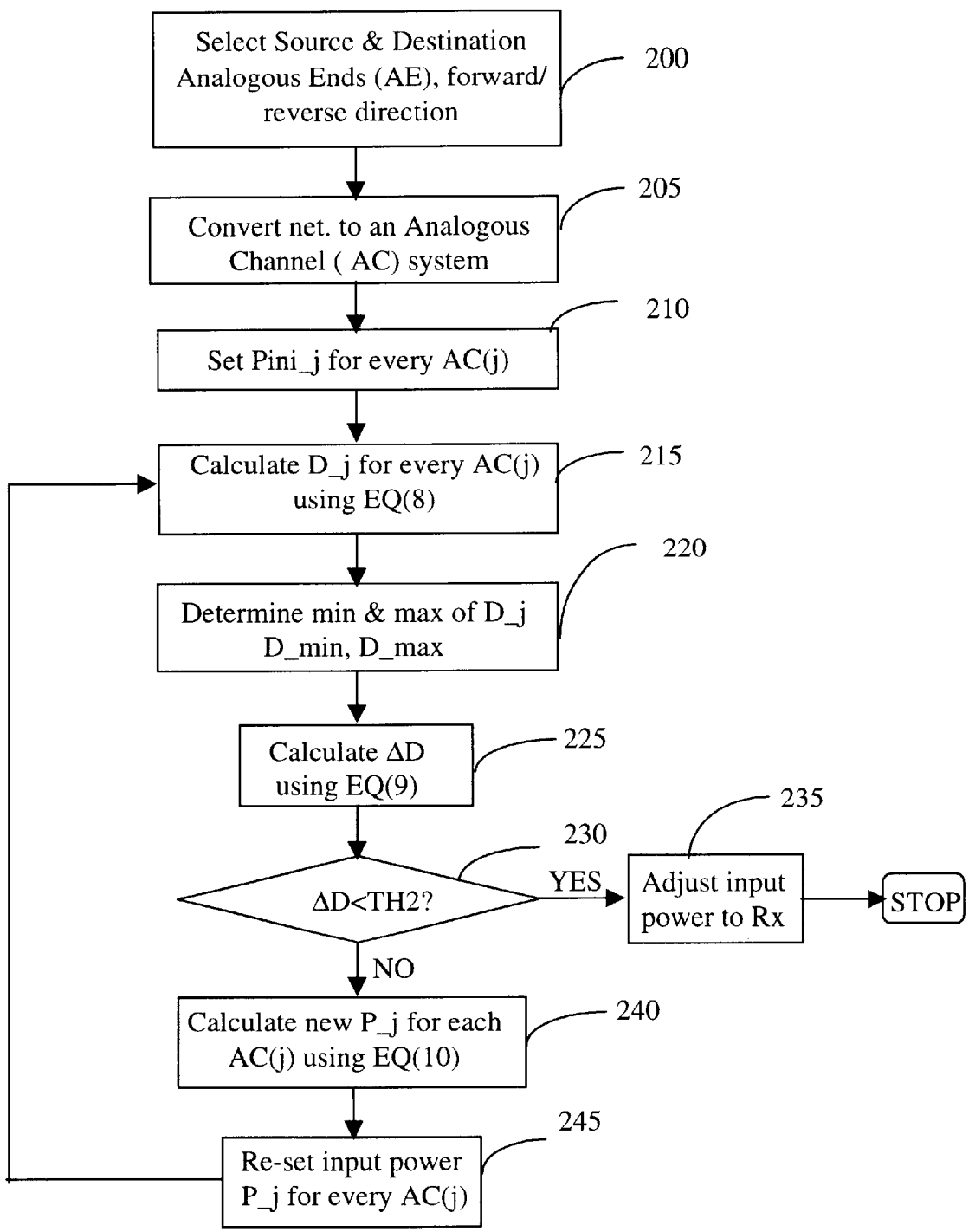
FIG. 5A shows a flow-chart of the method of equalization based on BER margin.

AC method for performance monitoring and channel equalization based on BER margin is illustrated in FIG. 5A. Steps 200 and 205 are similar to steps 100 and 105 described in connection with the method of equalizing the link using OSNR and therefore are not described here in detail.

Figure 5B:
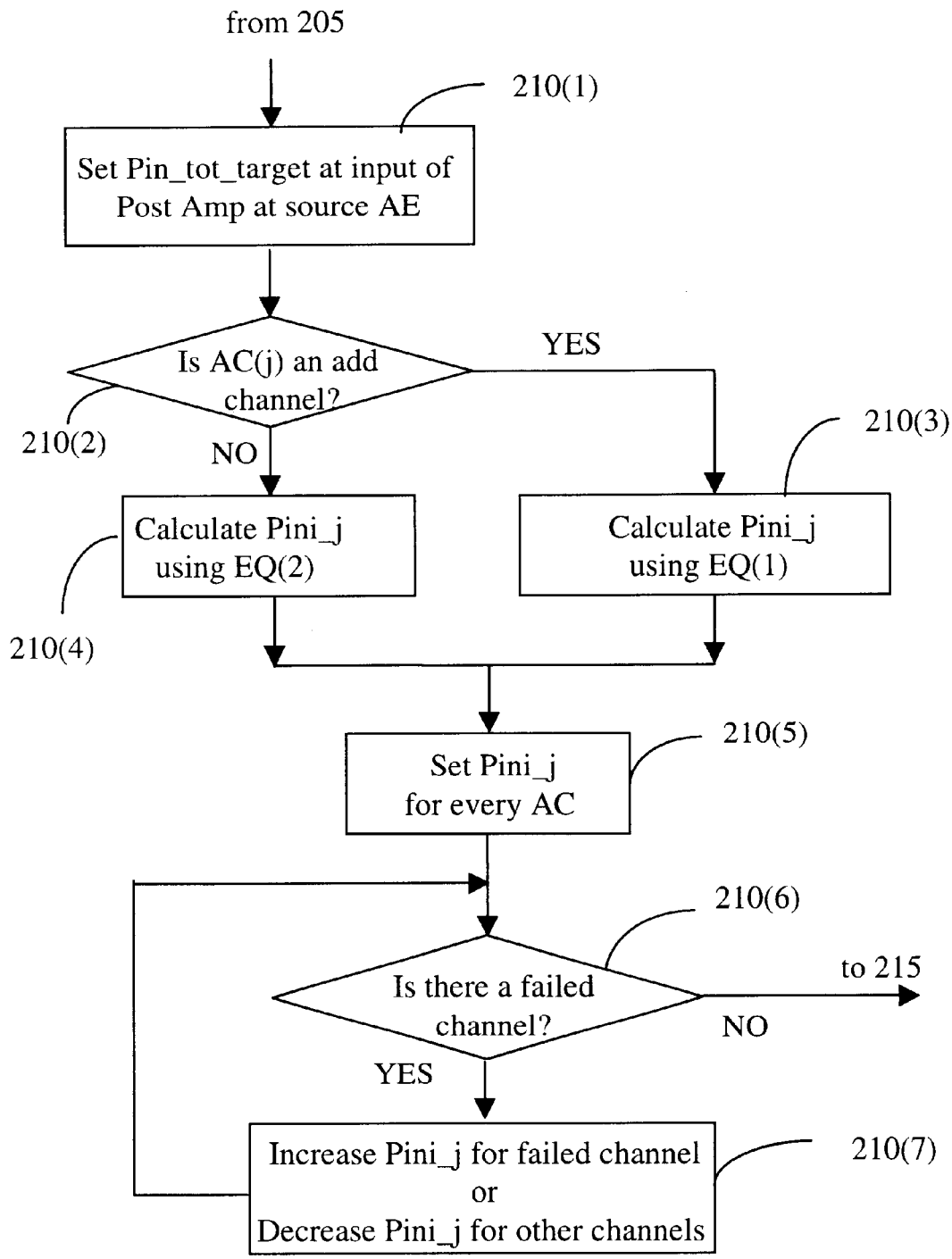
FIG. 5B illustrates the step of setting the input power.

Pini_j is the notation used for the initial input power for an analogous channel AC(j) when describing the BER margin method. Pini_j is set in step 210, as shown in further details in FIG. 5B.

Namely, a total target input power Pin_tot_target_dBm is provided at the postamplifier module of the MOA, shown in step 210(1). The value of the initial input power Pini_j is calculated using EQ(1) for the case of an add channel, as shown in step 210(3), or using EQ(2), for the case of an express or drop channel, as shown in step 210 (4).

Ppeak and Loss_before_OADM in EQ(1) have the same significance as disclosed in connection with FIG. 4C.

In step 210(5) the initial power Pini_j is set for each AC to the respective value calculated in step 210(3) or 210(4). In step 210(5) it is determined if any channel has failed prior to equalization, using the selected fail criterion. For example, if BER_fail is the criterion for determining failure of a channel, the channel is declared failed if BER measured at the receiver of that channel is greater than BER_fail. Other criteria may be used to determine failure of a channel.

If it is found that a channel has failed prior to equalization, the initial power Pini_j of a failed channel is increased, as shown in step 210 (7). If the channel still fails after increasing power to maximum, the power of all other channels is reduced until the failed channel becomes operational, e.g. until the BER measured at the receiver becomes less than BER_fail.

If all channels operate according to the specification, e.g. at a BER lower than the BER_fail, as shown by branch "NO" of decision block 210(6), the method of equalization continues with step 215 shown on FIG. 5A, where a distance to failure D_j is calculated for each channel. This step is illustrated in further detail on FIG. 5C.

all channels are determined in step 220 and a difference ΔD between these values is calculated in step 225:

$$\Delta D = D\_j\_\max - D\_j\_\min \quad\quad EQ(9)$$

if ΔD is less than a specified value, herein referred to as a second threshold TH2, as shown in step 230, the equalization is considered terminated. TH2 could be 1 dB or other value, according to the requirement for the respective network. The power input to the receivers may be now adjusted using the respective VOA, as shown in step 235.

If ΔD is greater than threshold TH2, a new input power P_j is calculated, using an adjustment coefficient, noted Coeff. The adjustment coefficient is selected based on experiments and simulations.

The new input power P_j is determined in step 240 according to EQ(10)

$$P\_j = Pini\_j - \text{Coeff}*(D\_j - D\_\min) \quad\quad EQ(10),$$

Input power of all ACs is re-set to the values calculated with EQ(10) and steps 215 to 245 are repeated until ΔD becomes less than the threshold TH2.

These results are preferably recorded in an equalization table. An example of an equalization table for recording data and calculation is shown as Table 2 below:

TABLE 2

| AC# (1) | λ (nm) | Channel Type (expr/add/drop) | Pmax_i (dBm) | Patt_i (dBm) | D_i (dB) | D_min (dB) | P_i (dBm) | Comments |
|---|---|---|---|---|---|---|---|---|

Figure 5C:
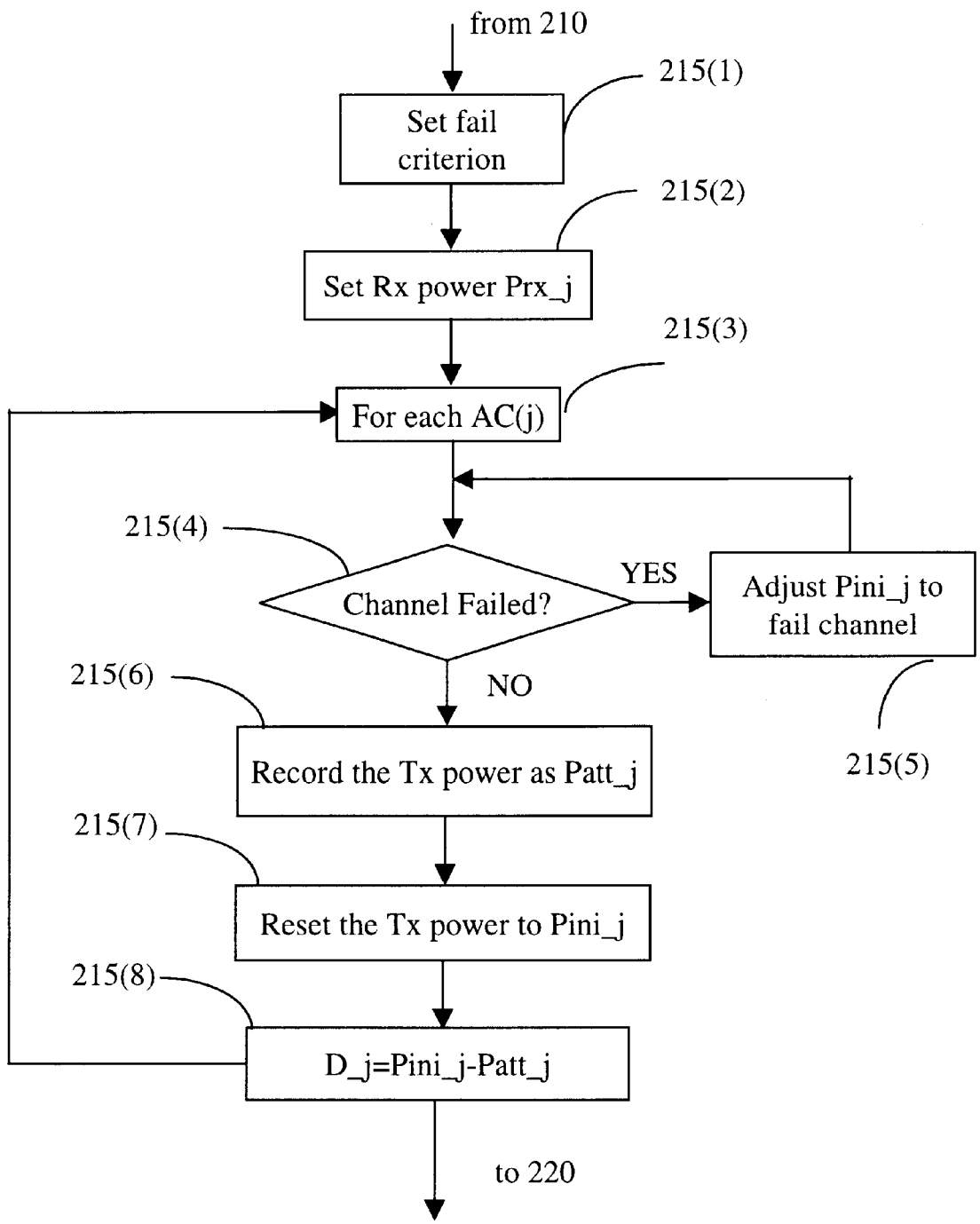
FIG. 5C illustrates the step of determining the distance to failure.

Step 215(1) on FIG. 5C shows that a fall criterion is set for the respective link, which in general is $10^{-9}$.

In step 215(2), the received power Prx_j is adjusted at each receiver using the associated VOA to a value within the dynamic range of the respective receiver, according to the receiver specification. In the example of FIG. 3A, the power of receiver 15(2) is adjusted using the corresponding VOA of unit 17. Prx_j may be measured from the transmitter site, by remote log in to the receiver site and bringing up the performance monitor (PM) screen for each channel.

Then, in step 215(4) and 215(5) the initial power Pini_j is adjusted until the respective channel fails. When BER is used for determining a failure in the channel performance, the actual BER at which the channel operates is measured, for each channel, and the measured BER value is compared to BER_fail. If the measured BER is greater than BER_fail, the input power Pini_j for the respective failed channel is decreased until the channel falls. When rate R is used, R is calculated or read on the PM screen and compared against a range to determine if the channel is failed. To fail a channel, the input power is adjusted until R falls within the range.

Next step 215(6) comprises recording the power of each transmitter at the point of channel failure as the attenuated power Patt_j. It is to be noted that when Patt_j is measured for AC(j), the initial input power Pini_j of the remaining ACs, other than that currently under adjustment, should remain unchanged. This is shown in step 215(7), i e. the power of each transmitter is returned to the Pini_j after Patt_j has been recorded.

The distance to failure D_j for the respective channel is calculated in step 215(7) as the difference between Pini_j and Patt_j:

$$D\_j = Pini\_j - Patt\_j \quad\quad EQ(8)$$

Returning now to FIG. 5A, the minimum and maximum values of the distances to failure calculated in step 215(7) for Finally, as a precautionary measure, the R values may be measured again for each AC for verifying if the system performance is acceptable. All ACs must be practically error-free after step 235, i.e. must have a BER lower than $10^{-12}$.

We claim:

1. A method for performance monitoring and equalization of an optical link between two line terminating equipment (LTE/REGEN) sites of an optical network and being provided with at least one intermediate sites equipped with an optical add/drop multiplexers (OADM), comprising:

selecting a direction of transmission and accordingly defining one of said LTE/REGEN sites as a source analogous end (AE) and the other as a destination AE;

converting said optical link into a two-ended analogous system of J analogous channels (AC), each AC(j) originating at said source AE and terminating at said destination AE; and adjusting the input power of each AC(j) to obtain a substantially equal performance parameter for all ACs, where J>2, j is the identifier of an AC, and j∈[1,J].

2. A method as claimed in claim 1, wherein performance parameter is the BER margin.

3. A method as claimed in claim 2, wherein said step of adjusting the input power comprises:

for each AC(j), setting an initial input power Pini_j at said transmitter and measuring the optical signal-to-noise ratio OSNR_j at said receiver;

determining a distance to failure D_j;

determining the minimum and the maximum distances to failure among said distances to failure calculated for each AC(j) and calculating the difference ΔD between the maximum and the minimum distances to failure;

whenever said difference ΔD is less than a second threshold, adjusting said initial input power Pini_j; and repeating steps (b) to (d) unit said difference becomes greater or equal to said second threshold.

4. A method as claimed in claim 3, further comprising the step of adjusting the power at the input of said receiver according to a provisioned value; whenever said difference is greater than said second threshold.

5. A method as claimed in claim 3, wherein said step (a) of setting an initial input power Pini_j comprises:

provinding a total target input power Pin_tot_target at said source AE;

calculating said initial input power and setting the power of said transmitter to said initial input power Pini_j;

measuring a channel failure indicator indicative of said AC(j) failure; and whenever said channel failure indicator show that said AC(j) is failed, effecting one of adjusting said initial input power of said AC(j) and adjusting said initial input power for all other channels of said optical link by a same amount until said channel failure indicator shows that said AC(j) is not failed.

6. A method as claimed in claim 5, wherein said channel failure indicator is one of the BER value and rate R.

7. A method as claimed in claim 3, wherein said step (b) of determining a distance to failure comprises:

setting a fail value for said channel failure indicator;

setting the power of said receiver at a specified value Prx_j;

measuring said channel failure indicator for said specified value Prx_j and comparing same with said fail value;

adjusting said initial input power Pini_j until said channel failure indicator attains said fail value, and recording said input power as an attenuated power Patt_j;

re-setting said initial input power Pini_j at the input of said transmitter; and calculating said distance to failure as the difference between said initial input power and said attenuated power.

8. A method as claimed in claim 7, wherein said channel failure indicator is one of the BER value and rate R.

9. A method as claimed in claim 8, wherein said new input power P_j is calculated according to equation P_j=Pini_j−Coeff*(D_j−D_min), where Coeff is an adjustment coefficient.

10. A method as claimed in claim 3, wherein said step (d) of adjusting said initial input power Pini_j comprises:

calculating a new input power Pi_j for each AC(j) based on said initial input power Pini_j and said distance to failure; and re-setting said input power at said transmitter to said new input power P_j.

11. A method as claimed in claim 1, wherein said step of converting comprises, for each communication channel (j) originating and terminating at and between said LTE/REGEN sites:

identifying a transmitter and a receiver connected by said communication channel;

if said transmitter is physically located at an intermediate site, converting said channel into an add AC having said transmitter located at said source AE, and a lossless fiber span between said intermediate site and said source AE;

if said receiver is physically located at an intermediate site, converting said channel into a drop AC having said receiver at said destination AE, and a lossless fiber between said intermediate site and said destination AE; and converting said channel into an express AC when said transmitter and said receiver are physically located at respective LTE/REGEN sites.

* * * * *